United States Patent
Miyata

(10) Patent No.: US 7,573,585 B2
(45) Date of Patent: Aug. 11, 2009

(54) DETECTION APPARATUS DETECTING PREDETERMINED POSITIONS OF MEMBER

(75) Inventor: Kouji Miyata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/249,173

(22) Filed: Oct. 10, 2008

(65) Prior Publication Data

US 2009/0097042 A1    Apr. 16, 2009

(30) Foreign Application Priority Data

Oct. 12, 2007    (JP)   .......................... P2007-266750

(51) Int. Cl.
     *G01B 11/14*    (2006.01)
     *G01B 11/00*    (2006.01)

(52) U.S. Cl. ........................ 356/620; 356/614; 356/617; 356/399

(58) Field of Classification Search ... 356/237.1–241.6, 356/426–431, 600–640
See application file for complete search history.

(56) References Cited

U.S. PATENT DOCUMENTS

| | | | |
|---|---|---|---|
| 4,025,442 A * | 5/1977 | Cass ..................... | 235/462.08 |
| 4,429,219 A * | 1/1984 | Yochum et al. ............. | 250/229 |
| 4,631,519 A * | 12/1986 | Johnston ....................... | 341/13 |
| 5,570,016 A * | 10/1996 | Schroeder et al. ....... | 324/207.25 |
| 5,592,401 A * | 1/1997 | Kramer ....................... | 702/153 |
| 6,937,349 B2 * | 8/2005 | Jones et al. ................. | 356/617 |
| 6,956,198 B2 * | 10/2005 | Alsobrooks et al. ..... | 250/231.13 |
| 7,078,677 B2 * | 7/2006 | Chong et al. ........... | 250/231.18 |
| 7,329,888 B2 * | 2/2008 | Van Bilsen et al. .......... | 250/548 |

* cited by examiner

*Primary Examiner*—L. G Lauchman
*Assistant Examiner*—Jarreas C Underwood
(74) *Attorney, Agent, or Firm*—Frommer Lawrence & Haug LLP; William S. Frommer

(57) ABSTRACT

A detection apparatus detecting predetermined positions of a member includes: n ($n \geq 2$) sensors one-dimensionally disposed at a sensor pitch equal to or greater than a distance D; and a member to be detected having m ($2 \leq m \leq n$) parts to be detected, the m parts to be detected being formed in k respective positions ($k \leq {}_nC_m$) in respective patterns of disposition which are unique with respect to each other. The pattern of disposition of the n sensors and the pattern of disposition of the m parts to be detected at each of the k locations are determined such that, when all of the m parts to be detected act on m sensors among the n sensors, a difference equal to or grater than the distance D exists between values of at least one neighboring sensor pitch at two locations arbitrarily selected from among the k locations, the neighboring sensor pitch belonging to a combination of neighboring sensor pitches which are pitches between neighboring sensors among the m sensors acting on the parts to be detected arranged in the order in which the sensors are arranged.

3 Claims, 5 Drawing Sheets

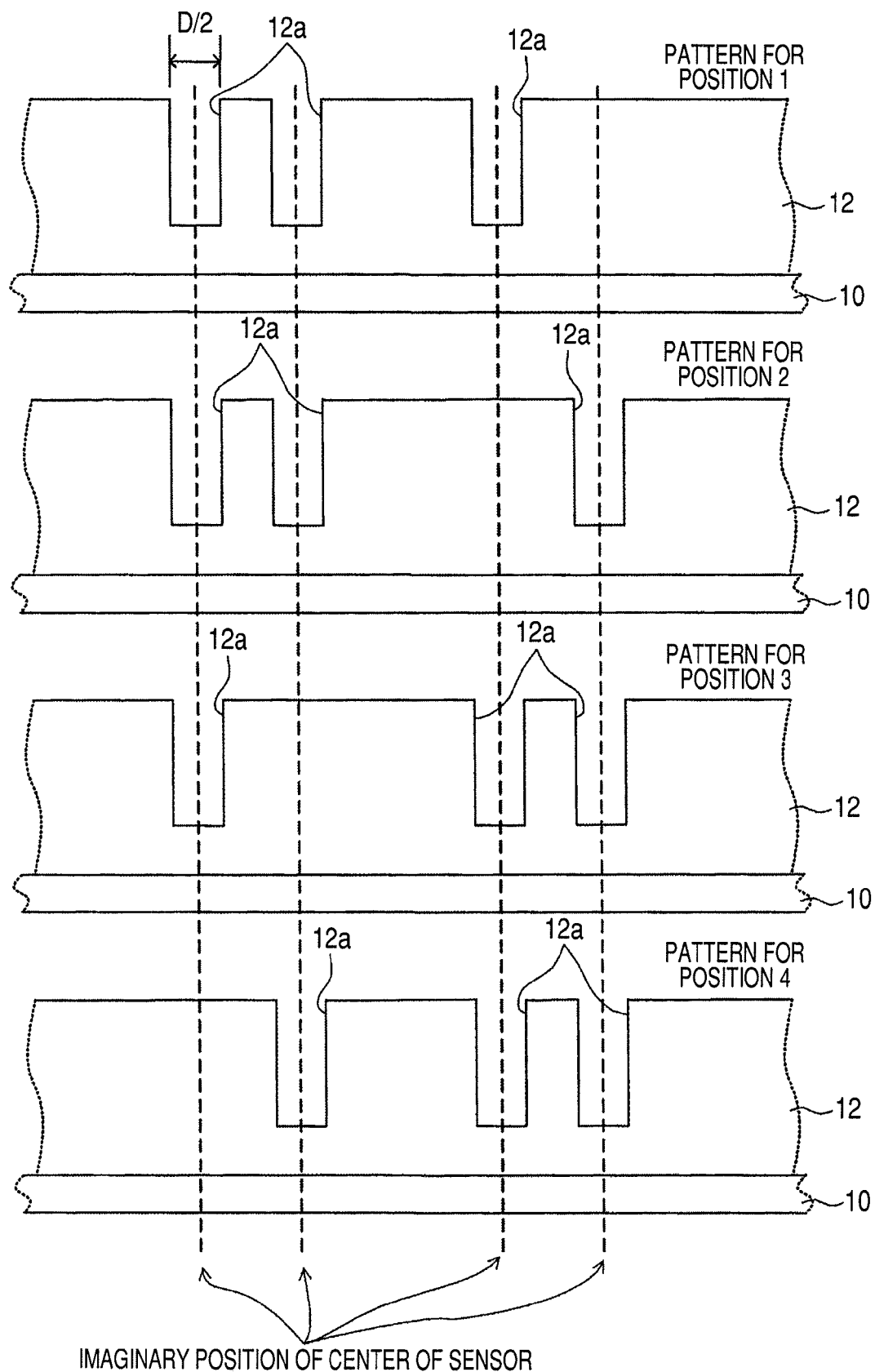

DETECTION APPARATUS DETECTING PREDETERMINED POSITIONS OF MEMBER

CROSS REFERENCES TO RELATED APPLICATIONS

The present invention contains subject matter related to Japanese Patent Application JP 2007-266750 filed in the Japanese Patent Office on Oct. 12, 2007, the entire contents of which being incorporated herein by reference.

BACKGROUND OF THE INVENTION

1. Field of the Invention

The present invention relates to a detection apparatus detecting the positions of predetermined locations of a member to be detected using a plurality of sensors.

2. Description of the Related Art

There are well-known detection apparatus which detect predetermined positions of a rotating or linearly moving member to control, for example, the stopping of the member.

Such a detection apparatus includes a sensor and detects the position of a member when the sensor reacts to a predetermined pattern formed on the member. As a result, various processes can be carried out including controlling the member to stop it in a detected position of the member. The detected position may be a position at a certain angle of rotation in the case of a rotating member. In the case of a member in a linear movement, the detected position may be a certain position of the member in the longitudinal direction thereof.

When positions are detected as thus described, the greater the number (n) of sensors are used, the greater the number of positions to be detected. In general, a sensor output is a binary output which assumes, for example, a value "1" indicating detection or a value "0" indicating non-detection. When a unique pattern to be detected is provided in association with each of n sensors, n rows of such patterns must be provided as patterns to be detected by the n sensors which acquire arbitrary positions. Therefore, it is necessary to form $2^n$ patterns in total.

SUMMARY OF THE INVENTION

A physical space sufficient to dispose n rows of patterns is required in order to implement the above-described method, and a problem arises in that it is difficult in some applications to provide such a space.

It is therefore desirable to provide a detection apparatus detecting predetermined positions of a member, in which patterns to be detected can be efficiently disposed and in which sensors can be disposed in a small area.

According to an embodiment of the invention, there is provided a detection apparatus including n (n≧2) sensors one-dimensionally disposed at a sensor pitch equal to or greater than a distance D and a member to be detected having m (2≦m≦n) parts to be detected, the m parts to be detected being formed in k respective positions (k≦$_nC_m$) in respective patterns of disposition which are unique with respect to each other. The pattern of disposition of the n sensors and the pattern of disposition of the m parts to be detected at each of the k locations are determined such that, when all of the m parts to be detected act on m sensors among the n sensors, a difference equal to or grater than the distance D exists between values of at least one neighboring sensor pitch at two locations arbitrarily selected from among the k locations, the neighboring sensor pitch belonging to a combination of neighboring sensor pitches which are pitches between neighboring sensors among the m sensors acting on the parts to be detected arranged in the order in which the sensors are arranged.

In the above configuration, when the member to be detected moves relative to the n sensors, the m parts to be detected provided in each of the k locations are detected by the n sensors.

At this time, all of the m parts to be detected (2≦m≦n) act on m sensors among the n sensors (m may equal n) in a certain position of the member to be detected. Since the n detected parts in the k locations of the member to be detected have respective patterns of disposition which are unique with respect to each other, the patterns of disposition of the n sensors are determined accordingly.

Let us assume that the n sensors are at a neighboring sensor pitch of any value equal to or greater than the distance D such as 1.5D and 2D. Let us discuss about combinations of pitch between each pair of neighboring sensors among the n sensors on an assumption that all of the m parts to be detected act on the sensors, the pitches being combined according to the order in which the sensors are arranged. For example, let us assume that the number of sensors n is 3 and that sensors 1, 2, and 3 are arranged in the order listed. Then, a combination [L12, L23] at each of locations A and B (the number of location k is 2) will be discussed where "L12" represents the distance between the sensors 1 and 2 and "L23" represents the distance between the sensors 2 and 3. The above combination is defined as [L12a, L23a] and [L12b, L23b] at the locations A and B, respectively.

In the present embodiment, the pattern of disposition of the n sensors and the pattern of disposition of the m parts to be detected at each of the k locations are determined such that at least one of neighboring sensor pitch differences between the two combinations, i.e., |L12a−L12b| or |L23a−L23b| becomes equal to or greater than the distance D.

As a result, when each of the k locations (two locations in the above-described example) passes through the position of the n sensors, the sensors each output a bit of different bit array for each location, for example, when "1" indicates that the sensors detect the presence (action) of a part to be detected and "0" indicates that the sensors do not detect the presence (action) of a part to be detected.

As thus described, in the embodiment of the invention, up to $_nC_m$ locations can be detected using n sensors only by adapting the disposition of the n sensors to conditions for combinations of neighboring sensor pitches as described above and forming the m parts to be detected in the respective detecting locations in patterns of disposition which are unique with respect to each other.

In another embodiment of the invention, in addition to the features of the above embodiment, the distance D is a distance that is twice a minimum pattern width of the parts to be detected which allows reliable detecting operations of the sensors, the distance being set in consideration of the detection accuracy of the sensors and the processing tolerance of the patterns of the parts to be detected.

More preferably, the pattern width of the m parts to be detected is in the range between a lower value "D/2" and an upper value "E/2", inclusive, where "E" represents a minimum value of pitches between neighboring sensors among the n sensors.

In addition to the features of the above-described embodiment, according to the present embodiment, limits for ensuring reliable operations can be defined when it is attempted to dispose patterns with higher efficiency. Therefore, patterns can be efficiently disposed without reducing reliability of operations.

According to the embodiments of the invention, there is provided a detection apparatus detecting predetermined positions of a member, in which predetermined patterns to be detected can be efficiently disposed and in which sensors can be disposed in a small area.

BRIEF DESCRIPTION OF THE DRAWINGS

FIG. 5 is an illustration showing patterns representing four unique positions according to Embodiment 2 of the invention.

DETAILED DESCRIPTION OF THE INVENTION

A description will now be made with reference to the drawings on the embodiments of the invention in which rotational positions of a disk changer are detected by way of example.

Figure 1:
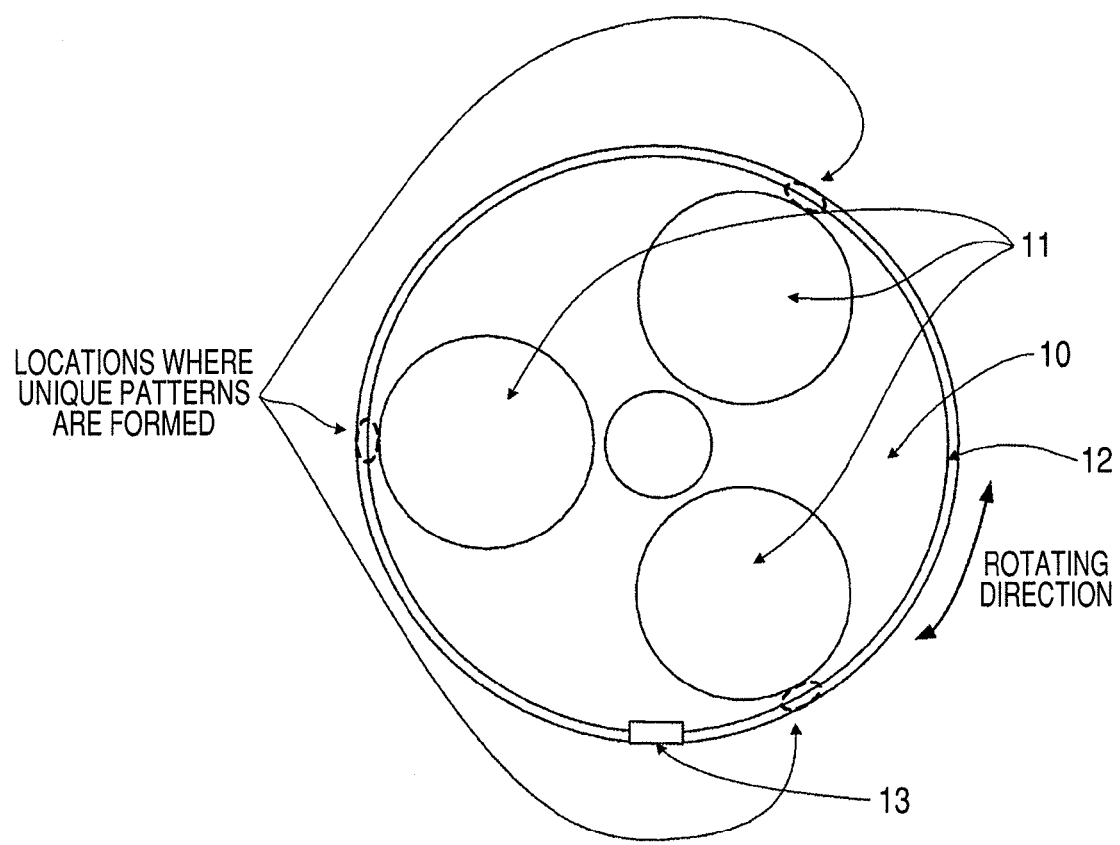
FIG. 1 is a schematic plan view showing a part of a disk changer mechanism according to an embodiment of the invention.

FIG. 1 shows a part of a disk changer mechanism which can be loaded with three compact disks.

The disk changer mechanism shown in FIG. 1 includes a changer table 10 which is rotated about a center axis by a motive force from a rotary drive section (not shown). The changer table 10 has disk trays 11 formed by circular pits in which disks are dropped and accommodated, the disk trays being provided in three locations. The table is controlled to stop stepwise at angles of rotation of 120 deg each to select a disk tray 11 to be put in a face-to-face relationship with a recording/reproducing section (not shown). A control circuit for such stoppage control is omitted in the illustration.

The changer table 10 includes an upstanding portion 12 which is provided near the periphery of the top surface of the table having the disk trays 11 formed thereon and on which patterns for detecting stopping positions are disposed or formed. The upstanding portion 12 is a circumferential wall member in the form of a ring or band standing on the top surface of the change table 10 to a predetermined height. Films made of a material to be detected having predetermined patterns are disposed or formed on an inner circumferential surface or outer circumferential surface of the upstanding portion 12. Alternatively, slits having predetermined patterns are formed by cutting parts of the upstanding portion 12 in the form of notches or openings. The predetermined patterns are provided in three locations of the upstanding portion which are equally spaced in the circumferential direction of the changer table 10. Each of the patterns is uniquely formed relative to each other. In the illustrated example, the patterns are formed in three locations where the distance from the three disk trays 111 to the upstanding portion 12 is smallest.

The changer table 10 is also provided with a sensor unit 3. The sensor unit 3 is a part having a plurality of sensors capable of optically, magnetically or mechanically detecting the predetermined patterns disposed therein. The unit is provided in a position in the vicinity of the upstanding portion 12 at such a distance from the section that the sensors can detect the patterns. The sensor unit 13 may be provided in any circumferential position of the changer table 10 as long as the sensors can detect the patterns as thus described.

The sensors in a predetermined quantity n disposed in the sensor unit 13 may be magnetic sensors such as magneto-resistive elements or Hall elements or sensors which are slid on a wall of the upstanding portion 12 to mechanically detect the positions of the slits. In this case, optical sensors such as photo-interruptors are used as an example.

In the disk changer mechanism which can accommodate three compact disks of the present embodiment, the three disk trays 11 must stop at three particular locations for recording or reproduction of a disk. For this reason, when the patterns (or slits allowing light to pass in the case of photo-interruptors) formed on the upstanding portion 12 pass through the area where the sensors are disposed, the three patterns which are uniquely formed relative to each other are detected. A particular pattern which approaches the sensor unit 13 when a desired disk tray 11 is about to face the recording/reproducing section is detected, and the rotation of the changer table 10 is stopped in response to the detection of the pattern. Since each of the three patterns has a unique disposition, control can be exercised to stop any of the three disk trays 11 for recording or reproduction.

The upstanding portion 12 or the changer table 10 including the upstanding portion 12 is an example of "a member to be detected" as described in the summary of the invention. The sensor unit 13 includes n sensors therein. Therefore, the disk changer mechanism having the partial configuration shown in FIG. 1 is an example of "a detection apparatus detecting predetermined positions of a member" as described in the summary of the invention.

In order to detect the three locations each having a unique pattern, it is desired to provide three sensors because the number of combinations of two different patterns arbitrarily selected from among the three patterns is $_3C_2=3$. It is also desired that the pitch between neighboring sensors among the n sensors in two arbitrary positions is determined according to the unique patterns in the three locations described above.

Specifically, the pitch between neighboring sensors among the n sensors is equal to or greater than a distance D. The pitch equal to or greater than the distance D may be a multiple of the distance D obtained by a factor of 1 or more. The pitch may be a value having a fractional part rather than a multiple of the distance D as long as it is equal to or greater than the distance D. For example, the pitch may be a value based on the distance D such as 1.1D, 1.5D, 2.3D, and so on. Alternatively, when the distance D is 0.5 mm, the pitch may be 0.5 mm or any value greater than 0.5 mm.

Let us assume that a minimum constituent element of a pattern as described above (e.g., one slit) constitutes "a position to be detected" and that the number of such slits in each location to be detected is represented by m ($2 \leq m \leq n$). Let us discuss about combinations of pitch between each pair of neighboring sensors among n sensors on an assumption that all of the m parts to be detected act on the sensors, the pitches being combined according to the order in which the sensors are arranged.

For example, let us assume that the number of sensors n is 3 and that sensors 1, 2, and 3 are arranged in the order listed. Then, a combination [L12, L23] at each of locations A, B, and C (the number of location k is 3) will be discussed where "L12" represents the distance between the sensors 1 and 2 and "L23" represents the distance between the sensors 2 and 3. The above combination is defined as [L12a, L23a], [L12b, L23b], and [L12c, L23c] at the locations A, B, and C, respectively.

In the present embodiment, the pattern of disposition of the n sensors and the pattern of disposition of the m parts to be detected at each of the k locations are determined such that at least one of pitch differences between each of the three combinations of neighboring sensors becomes equal to or greater than the distance D. Specifically, the patterns are determined so as to satisfy the following conditions: at least either of pitch differences |L12a–L12b| and |L23a–L23b| between the locations A and B is to be equal to or greater than the distance D; at least either of pitch differences |L12b–L12c| and |L23b–L23c| between the locations B and C is to be equal to or greater than the distance D; and at least either of pitch differences |L12c–L12a| and |L23c–L23a| between the locations C and A is to be equal to or greater than the distance D.

The conditions will be hereinafter referred to as "conditions for pitch differences between neighboring sensors".

EMBODIMENT 1

Figure 2:
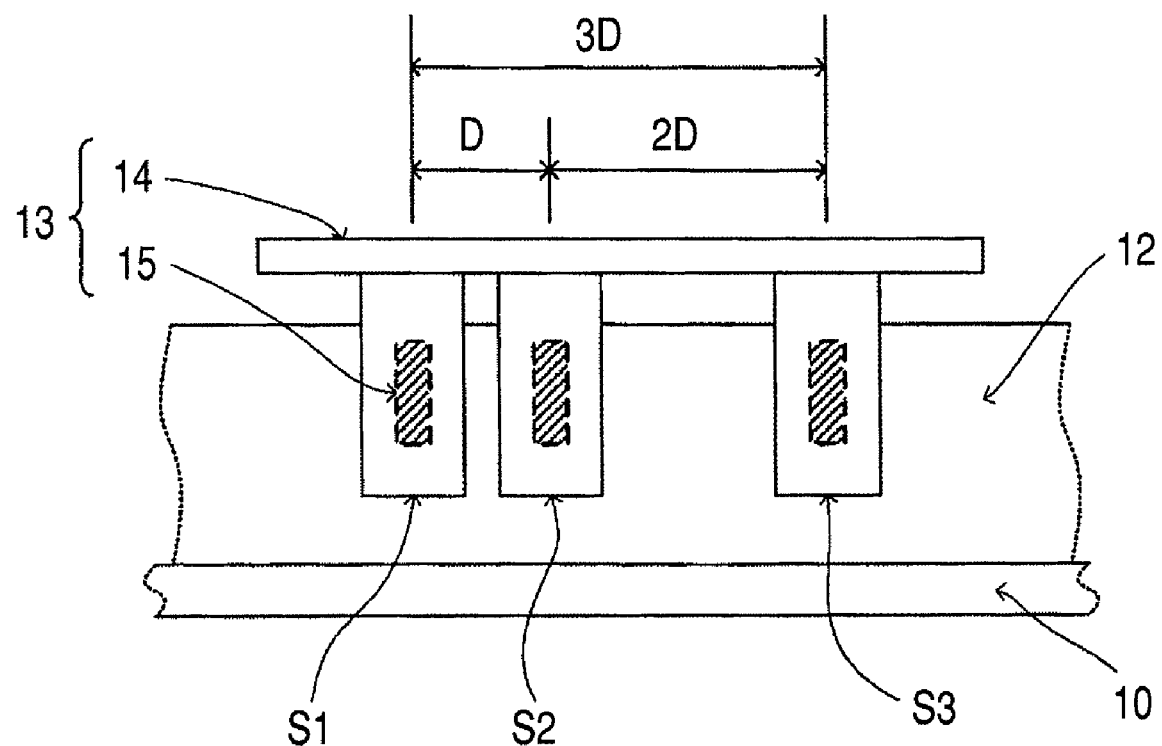
FIG. 2 is an illustration of disposition of sensors according to Embodiment 1 of the invention.

FIG. 2 is a detailed illustration of disposition of a sensor unit 13.

The sensor unit 13 shown in FIG. 2 includes three sensors, i.e., sensors S1, S2, and S3 which are disposed in a row (one-dimensionally disposed) on a bottom surface of a substrate 14. Each of the sensors includes a light-detecting section 15. The sensors are disposed in such a direction that the distances from the light-detecting sections 15 of the sensors to the upstanding portion 12 are substantially equal to each other.

Although not shown, a light-emitting element is provided in a position opposite to the light-detecting section 15 of each sensor (in a position on the other side of the upstanding portion 12 in the illustration). Normally, when no slit (opening or notch) as "a position to be detected" is provided as illustrated, light from the light-emitting element does not enter the light-detecting section 15 because it is blocked by the upstanding portion 12. When slits are provided, the light is received by the light-detecting section 15 for the period during which the light passes through the slits, and a detection signal in the form of a pulse is output by the sensors.

Let us now assume that "D" represents a distance that is twice a minimum pattern width which allows reliable operations, the distance being set in consideration of the detection accuracy and amounting accuracy of the sensors and the processing accuracy of slit patterns formed on the upstanding portion 12.

FIG. 2 indicates that the sensors S1 and S2 are spaced from each other by the distance D and that the neighboring sensor pitch between the sensors S2 and S3 is "2D".

The sensors S1 and S3 are spaced from each other at an interval "3D". Thus, there is a difference of "D" between a neighboring sensor pitch between the sensors S1 and S2 and a neighboring sensor pitch between the sensors S2 and S3, there is a difference of "2D" between a neighboring sensor pitch between the sensors S1 and S2 and a neighboring sensor pitch between the sensors S1 and S3, and there is a difference of "D" between a neighboring sensor pitch between the sensors S2 and S3 and a neighboring sensor pitch between the sensors S1 and S3. Since all of the differences between neighboring sensor pitches are equal to or greater than the distance "D" as thus described, the above-described "conditions for pitch differences between neighboring sensors" is satisfied.

Figure 3:
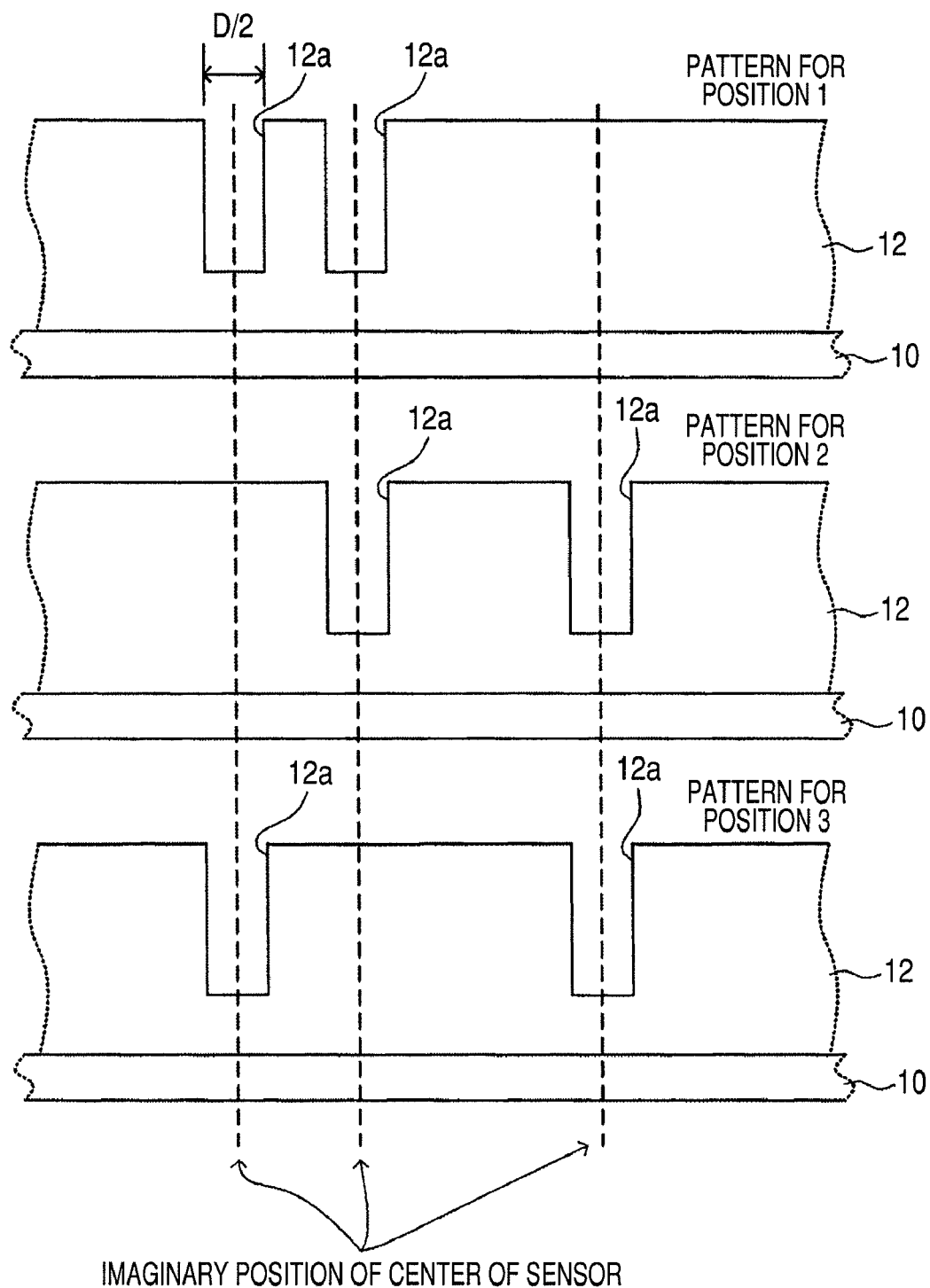
FIG. 3 is an illustration showing patterns representing three unique positions according to Embodiment 1 of the invention.

FIG. 3 shows patterns representing three unique positions.

Since the sensors in the present embodiment are photo-interruptors, signals are generated by blocking light and allowing light to pass. A similar configuration may be employed when mechanical switches or magnetic switches are used. Signals are generated by pushing the switches with protrusions in the former case and by using a magnet in the latter case.

Although light is basically blocked by the upstanding portion 12 as shown in FIG. 2, two notches (slits) 12a having a with of "D/2" are provided as shown in FIG. 3 to allow light to pass only when a particular pattern is to be represented. Thus, when slits in a pattern unique to a "position 1" pass the sensor section, the sensors S1 to S3 output respective pulses to form a pulse train [1, 1, 0] ("1" indicating that light is allowed to pass and "0" indicating that light is blocked).

Similarly, when slits in a pattern unique to a "position 2" pass the sensor section, the sensors S1 to S3 output respective pulses to form a pulse train [0, 1, 1]. When slits in a pattern unique to a "position 3" pass the sensor section, the sensors S1 to S3 output respective pulses to form a pulse train [1, 0, 1].

The neighboring slits in the positions 1 to 3 are at respective pitches of "D", "2D", and "3D", and arbitrary pairs of neighboring sensors are at pitches of "D" and "2D". It is therefore obviously ensured that a sensor pattern obtained at each position has uniqueness.

Incidentally, the two notches (slits) in the "position 1" having the shortest neighboring slit pitch may be connected to form one greater notch.

EMBODIMENT 2

Figure 4:
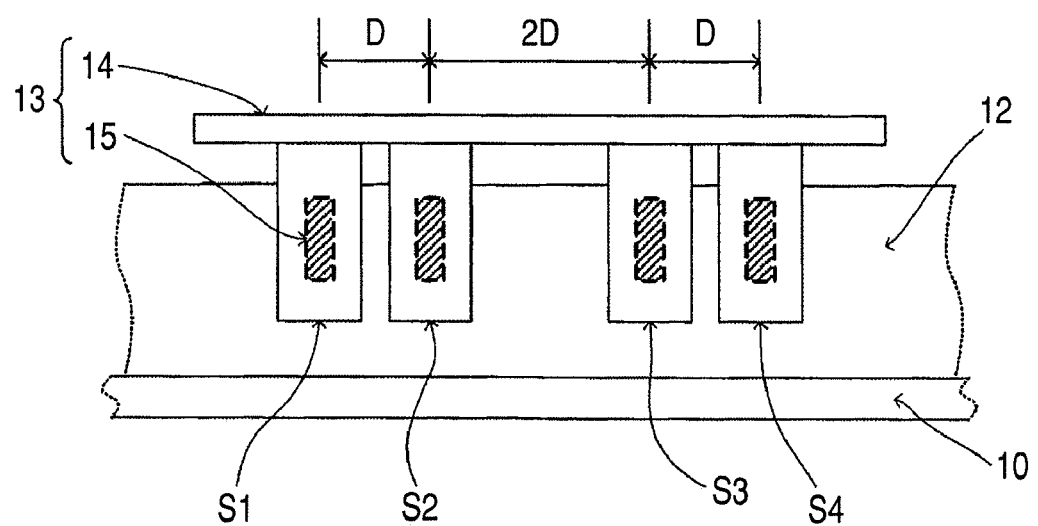
FIG. 4 is an illustration of disposition of sensors according to Embodiment 2 of the invention.

FIG. 4 shows disposition of sensors according to Embodiment 2 of the invention. A sensor unit 13 of the embodiment has a basic configuration similar to that described with reference to FIG. 2 except that the number n of sensors (n=4 in FIG. 4) is different from that shown in FIG. 2 (n=3).

In Embodiment 2, unique positions in four locations are detected using four sensors S1 to S4. The use of four sensors allows up to $_4C_2=6$ unique positions to be detected. The disposal width of the sensors or the distance from the center of the sensor S1 at one end to the center of the sensor S4 at the other end is "6D (=D+2D+3D)" at the minimum.

When it is desired to detect only four positions since only four sensors are used ($_4C_3=4$), the width can be as smaller as "4D (=D+2D+D). Since the sensor disposal width can be thus small, the sensor unit 13 can be made compact.

FIG. 5 shows patterns representing four unique positions. The number n of sensors (n=4 in FIG. 5) is different from that shown in FIG. 3 (n=3), and the number m of slits (m=3 in FIG. 5) as "positions to be "detected" is different from that shown in FIG. 3 (m=2). However, the description made with reference to FIG. 3 equally applies in that the slit patterns are determined such that all of the m slits are detected by m sensors among the n sensors (m≦n) and in that the slit patterns in the respective positions are unique with respect to each other.

Table 1 shows a summary of relationships between sensors capable of detecting slits in respective positions and pitches between neighboring sensors in the positions when three sensors are arbitrarily selected from among the four sensors S1 to S4 shown in FIG. 4.

TABLE 1

| Position | Slit-Detecting Sensors | Sensor Pitches |
|---|---|---|
| Position 1 | [S1, S2, S3] | [D, 2D] |
| Position 2 | [S1, S2, S4] | [D, 3D] |
| Position 3 | [S1, S3, S4] | [3D, D] |
| Position 4 | [S2, S3, S4] | [2D, 3] |

Among the combinations of pitches between neighboring sensors shown in Table 1, combinations of identical pitch values are regarded as different combinations when they are different in the order of the pitch values just as seen in the combinations [D, 3D] and [3D, D] and the combinations [D, 2D] and [2D, D]. Therefore, the above-described "conditions for pitch differences between neighboring sensors" are satisfied in that there is a pitch difference equal to or greater than the distance D between all pairs of neighboring sensor pitches, i.e., the pairs of [D, 2D] and [D, 3D], [D, 3D] and [3D, D], [3D, D] and [2D, D], and [2D, D] and [D, 2D] which can be arbitrarily selected.

The sensors output [1,1,1,0] in the position 1, [1,1,0,1] in the position 2, [1,0,1,1] in the position 3, and [0,1,1,1] in the position 4.

Therefore, when the above-described conditions are satisfied and the slit pattern in each position has uniqueness, the uniqueness of a signal pattern generated at each position can be also guaranteed by matching of the pitches between neighboring sensors and the arrangement of the slit patterns. It is therefore possible to distinguish four positions of a predetermined member from each other using three out of the four sensors, and control can be exercised to stop the member in each of four positions.

Modification 1

Obviously, the invention is not limited to the above-described embodiment, and the method of detection according to the embodiment can be used for detection of a member to be detected which is in a linear movement.

The rotating member (changer table 10) described in the embodiment of the invention has a diameter greater than the pitches at which the sensors are disposed. Therefore, the upstanding portion 12 may be considered to be in a linear movement relative to the n sensors. For this reason, the n sensors are disposed on a straight line.

When the diameter of the rotating member (changer table 10) is relatively small, however, the n sensors may be in a one-dimensional disposition having some curvature.

The invention is not limited to the changer table 10 and may be applied to any rotating member. The invention may be used for various linearly moving members including large-scale applications such as stopping a product-conveying belt of a production line at each of predetermined positions and slide mechanisms such as a stocker for inserting and removing a cassette.

Modification 2

In Embodiment 1, the distance D is described as "a distance that is twice a minimum pattern width which allows a reliable detecting operation of a sensor". However, the invention is not limited to such a definition.

A detecting operation of a sensor can be reliably performed without a problem as long as the distance D is equal to or greater than the "twice a minimum pattern width". Such a condition may be satisfied even when the distance D is arbitrarily set without knowing the condition. Such an instance may be regarded as an embodiment of the invention.

The above-described condition on the distance D is a condition to be met in order to dispose sensors and slit patterns with highest efficiency. When the condition is met, there is an advantage in that the sensor unit 13 can be made most compact and in that a required number of detecting locations can be provided even when the member to be detected is small.

Modification 3

When the distance D is "twice a minimum pattern width" as described in Modification 2, it is preferable to satisfy a further condition that "the pattern width of m parts to be detected (slits) is in the range between a lower value 'D/2' and an upper value 'E/2', inclusive, where 'E' represents a minimum value of pitches of neighboring sensors among n sensors. The purpose of this condition is to achieve matching such that the same slit will not be simultaneously detected by two sensors even in a case where the minimum pitch between neighboring sensors is not equal to the distance D as in Embodiments 1 and 2 but is equal to any other distance such as the distance 1.5D.

The embodiments of the invention provide the following advantages.

A plurality of unique positions can be set in a small space.

The structure of a mechanism having patterns for position detection can be simplified.

The layout of a plurality of sensors can be simplified.

As a result, a compact detection apparatus detecting predetermined positions of a member can be provided at a low cost.

It should be understood by those skilled in the art that various modifications, combinations, sub-combinations, and alterations may occur depending on design requirements and other factors insofar as they are within the scope of the appended claims or the equivalents thereof.

What is claimed is:

1. A detection apparatus detecting predetermined positions of a member, comprising:

n (n≧2) sensors one-dimensionally disposed at a sensor pitch equal to or greater than a distance D; and a member to be detected having m (2≦m≦n) parts to be detected, the m parts to be detected being formed in k respective positions (k≦$_nC_m$) in respective patterns of disposition which are unique with respect to each other, wherein the pattern of disposition of the n sensors and the pattern of disposition of the m parts to be detected at each of the k locations are determined such that, when all of the m parts to be detected act on m sensors among the n sensors, a difference equal to or grater than the distance D exists between values of at least one neighboring sensor pitch at two locations arbitrarily selected from among the k locations, the neighboring sensor pitch belonging to a combination of neighboring sensor pitches which are pitches between neighboring sensors among the m sensors acting on the parts to be detected arranged in the order in which the sensors are arranged.

2. The detection apparatus detecting predetermined positions of a member according to claim 1, wherein the distance D is a distance that is twice a minimum pattern width of the parts to be detected which allow reliable detection by the sensors, the distance being set in consideration of the detection accuracy of the sensors and the processing tolerance of the patterns of the parts to be detected.

3. The detection apparatus detecting predetermined positions of a member according to claim 2, wherein the pattern width of the m parts to be detected is in the range between a lower value "D/2" and an upper value "E/2", inclusive, where "E" represents a minimum value of pitches between neighboring sensors among the n sensors.

* * * * *